United States Patent
Tatsumi et al.

(10) Patent No.: US 8,393,065 B2
(45) Date of Patent: Mar. 12, 2013

(54) RETROFIT METHOD FOR PULVERIZED COAL BOILER

(75) Inventors: Tetsuma Tatsumi, Hitachinaka (JP); Masayuki Taniguchi, Hitachinaka (JP); Tsuyoshi Shibata, Hitachiota (JP); Yoshiharu Hayashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 330 days.

(21) Appl. No.: 12/908,551

(22) Filed: Oct. 20, 2010

(65) Prior Publication Data
US 2011/0094105 A1    Apr. 28, 2011

(30) Foreign Application Priority Data
Oct. 22, 2009    (JP) .................... 2009-243581

(51) Int. Cl.
- *B21K 21/16* (2006.01)
- *B21D 51/24* (2006.01)
- *B23P 6/00* (2006.01)
- *F23D 1/00* (2006.01)
- *F23B 70/00* (2006.01)

(52) U.S. Cl. ........... 29/401.1; 29/890.051; 29/890.031; 110/347; 110/204; 110/261; 110/263

(58) Field of Classification Search ............. 29/890.031, 29/890.051, 402.01, 402.03, 402.08; 110/341, 110/345, 347, 348, 210, 182.5, 204, 205, 110/261, 263

See application file for complete search history.

(56) References Cited

U.S. PATENT DOCUMENTS
| | | | | |
|---|---|---|---|---|
| 5,417,564 A | * | 5/1995 | Briggs | ............... 431/179 |
| 2009/0277363 A1 | * | 11/2009 | Shibata et al. | ............... 110/186 |

FOREIGN PATENT DOCUMENTS
| | | |
|---|---|---|
| JP | 5-26409 A | 2/1993 |
| JP | 2001-201406 A | 7/2001 |
| JP | 2009-79835 A | 4/2009 |

* cited by examiner

*Primary Examiner* — David Bryant
*Assistant Examiner* — Jun Yoo
(74) *Attorney, Agent, or Firm* — Crowell & Moring LLP

(57) ABSTRACT

A method for retrofitting a pulverized coal boiler in an air combustion boiler system is disclosed, which has a plurality of burners over a plurality of stages along the vertical direction on a wall surface of a furnace of the pulverized coal boiler and an after-air port for introducing air for two-stage combustion located above the burners to retrofit into a two-stage combustion pulverized coal boiler in an oxyfuel combustion boiler system.

6 Claims, 10 Drawing Sheets

(COMPARISON OF HEAT LOAD DISTRIBUTIONS IN AIR COMBUSTION AND OXYFUEL COMBUSTION)

(COMPARISON OF HEAT LOAD DISTRIBUTIONS IN AIR COMBUSTION AND OXYFUEL COMBUSTION)

RETROFIT METHOD FOR PULVERIZED COAL BOILER

CLAIM OF PRIORITY

The present application claims priority from Japanese patent application JP 2009-243581 filed on Oct. 22, 2009, the content of which is hereby incorporated by reference into this application.

BACKGROUND OF THE INVENTION

1. Field of the Invention

The present invention relates to a method for retrofitting a pulverized coal boiler in which a pulverized coal boiler in an air combustion boiler system is retrofitted into a pulverized coal boiler in an oxyfuel combustion boiler system.

2. Description of Related Art

As part of measures against global warming, a method of burning a mixture gas of highly-pure oxygen and combustion exhaust gas instead of using conventional air has been proposed for burning fuel in a boiler. Hereinafter, this method is referred to as oxyfuel combustion, and a combustion method using air is referred to as air combustion.

Since the majority of exhaust gas will be $CO_2$ in oxyfuel combustion, the exhaust gas does not require condensation for recovering $CO_2$. The exhaust gas can be directly compressed and cooled to separate $CO_2$ for liquefaction. This is one of the effective ways to reduce $CO_2$ emissions. As a conventional oxyfuel combustion boiler system, as stated in Japanese Patent application Laid-open No. Hei 5 (1993)-26409, such an oxyfuel combustion boiler system has been known in which a two-stage combustion pulverized coal boiler having a burner and an after-air port is provided with an air separation unit and a $CO_2$ recovering facility, and part of the combustion exhaust gas burnt in and exhausted from the pulverized coal boiler and combustion exhaust gas after $CO_2$ has been recovered are recirculated and supplied to the pulverized coal boiler after being mixed with oxygen manufactured in the air separation unit, to be used as an oxidizing agent for fuel.

In addition, Japanese Patent application Laid-open No. 2001-201406 discloses a retrofit method for a pulverized coal boiler in an air combustion system. This discloses a technique in which an after-air port is installed obliquely upward at a position below the tip of the flame produced by a burner in a furnace, thereby allowing adjustments of the combustion load in the furnace.

Patent Document 1: Japanese Patent Application Laid-open No. Hei 5 (1993)-26409
Patent Document 2: Japanese Patent Application Laid-open No. 2001-201406

SUMMARY OF THE INVENTION

In the method for retrofitting a pulverized coal boiler in the air combustion system disclosed in Japanese Patent Application Laid-open No. 2001-201406, there is no statement or suggestion with regard to retrofit into a pulverized coal boiler in the oxyfuel combustion system.

In the oxyfuel combustion boiler system stated in Japanese Patent Application Laid-open No. Hei 5 (1993)-26409, when the two-stage combustion pulverized coal boiler having a burner and an after-air port is used in the oxyfuel combustion boiler system, mostly-$CO_2$ combustion exhaust gas is recirculated as recirculation gas to be mixed with oxygen and used as combustion-enhancing gas for fuel.

In this oxyfuel combustion boiler system, a reduction in the recirculation amount of the exhaust gas helps to avoid a loss in exhaust heat recovery and to reduce the power of a blower for blowing the recirculation gas; thus, it is advantageous in improving net thermal efficiency.

On the other hand, the reduction in the recirculation amount of exhaust gas causes the oxygen concentration in combustion-enhancing gas to increase, raising the theoretical combustion temperature of fuel. As a result, the heat load on the furnace is drastically increased, which may damage the furnace due to temperatures exceeding the allowable temperature of metallic material making up the furnace. This will be a problem.

It is an object of the present invention to provide a method for retrofitting a pulverized coal boiler in which, when a pulverized coal boiler in the air combustion system is retrofitted into a two-stage combustion pulverized coal boiler having a burner and an after-air port in the oxyfuel combustion boiler system, the heat load on a furnace wall of the pulverized coal boiler is reduced so that retrofit into a pulverized coal boiler in the oxyfuel combustion boiler system which maintains structural reliability can be achieved at low cost in a short period of time.

A method for retrofitting a pulverized coal boiler in an air combustion boiler system having a plurality of burners over a plurality of stages along the vertical direction on a wall surface of a furnace of the pulverized coal boiler and an after-air port for introducing air for two-stage combustion located above the burners to retrofit into a two-stage combustion pulverized coal boiler in an oxyfuel combustion boiler system of the present invention, wherein installing an air separation unit for separating oxygen from air and a $CO_2$ recovery device for absorbing and separating $CO_2$ gas from combustion exhaust gas generated in the boiler furnace, wherein the method for retrofitting the combustion pulverized coal boiler is comprising the steps of: stopping to supply fuel into the furnace from a burner located in a middle stage among the plurality of stages of burners installed on the wall surface of the furnace of the pulverized coal boiler; installing a new burner to an opening of the after-air port provided on the wall surface of the furnace of the pulverized coal boiler; and installing a supply line to introduce the oxygen manufactured by the air separation unit and part of the recirculation gas, which is part of the exhaust gas exhausted from the pulverized coal boiler, circulated into the pulverized coal boiler, to the plurality of stages of burners except for the stopped burner and to the new burner installed to the opening of the after-air port through the supply line, and supplying the oxygen and the recirculation gas from the plurality of stages of burners and the new burner into the furnace.

Furthermore, a method for retrofitting a pulverized coal boiler in an air combustion boiler system having a plurality of burners over a plurality of stages along the vertical direction on a wall surface of a furnace of the pulverized coal boiler, a main after-air port and a sub-after-air port located in the lower stage of the main after-air port for introducing air for two-stage combustion located above the burners to retrofit into a two-stage combustion pulverized coal boiler in an oxyfuel combustion boiler system of the present invention, wherein installing an air separation unit for separating oxygen from air and a $CO_2$ recovery device for absorbing and separating $CO_2$ gas from combustion exhaust gas generated in the boiler furnace, wherein the method for retrofitting the combustion pulverized coal boiler is comprising the steps of: stopping to supply fuel into the furnace from a burner located in a middle stage among the plurality of stages of burners installed on the wall surface of the furnace of the pulverized coal boiler;

installing another burner to an opening of the main after-air port provided on the wall surface of the furnace of the pulverized coal boiler; and installing a supply line to introduce the oxygen manufactured by the air separation unit and part of the recirculation gas, which is part of the exhaust gas exhausted from the pulverized coal boiler, circulated into the pulverized coal boiler, to the plurality of stages of burners except for the stopped burner and to the another burner installed to the opening of the main after-air port through the supply line, and supplying the oxygen and the recirculation gas from the plurality of stages of burners and the another burner into the furnace.

Furthermore, a method for retrofitting a pulverized coal boiler in an air combustion boiler system having a plurality of burners over a plurality of stages along the vertical direction on a wall surface of a furnace of the pulverized coal boiler and an after-air port for introducing air for two-stage combustion located above the burners to retrofit into a two-stage combustion pulverized coal boiler in an oxyfuel combustion boiler system of the present invention, wherein installing an air separation unit for separating oxygen from air and a $CO_2$ recovery device for absorbing and separating $CO_2$ gas from combustion exhaust gas generated in the boiler furnace, wherein the method for retrofitting the combustion pulverized coal boiler is comprising the steps of: stopping to supply fuel into the furnace from a burner located in a middle stage among the plurality of stages of burners installed on the wall surface of the furnace of the pulverized coal boiler; installing a new burner to an opening of the after-air port provided on the wall surface of the furnace of the pulverized coal boiler; installing a new windbox to the plurality of stages of burners except for the stopped burner and to the new burner installed to the opening of the after-air port; and installing a supply line to introduce the oxygen manufactured by the air separation unit and part of the recirculation gas, which is part of the exhaust gas exhausted from the pulverized coal boiler, circulated into the pulverized coal boiler, to the plurality of stages of burners and to the new windbox installed to the opening of the after-air port through the supply line, and supplying the oxygen and the recirculation gas from the plurality of stages of burners and the new burner into the furnace.

According to the present invention, when retrofits a pulverized coal boiler in the air combustion boiler system into a two-stage combustion pulverized coal boiler having a burner and an after-air port in the oxyfuel combustion boiler system, the heat load on a furnace wall of the pulverized coal boiler can be reduced so that retrofit into the pulverized coal boiler in the oxyfuel combustion boiler system which maintains structural reliability can be achieved at low cost in a short period of time.

DETAILED DESCRIPTION OF THE INVENTION

A method for retrofitting a pulverized coal boiler according to an embodiment of the present invention is described below with reference to the figures.

(Embodiment 1)

The method for retrofitting a pulverized coal boiler in an air combustion boiler system into a pulverized coal boiler in an oxyfuel combustion boiler system according to an embodiment of the present invention will be described.

At first, the structure of a furnace of a pulverized coal boiler for the present invention will be described using FIG. 1.

Figure 1:
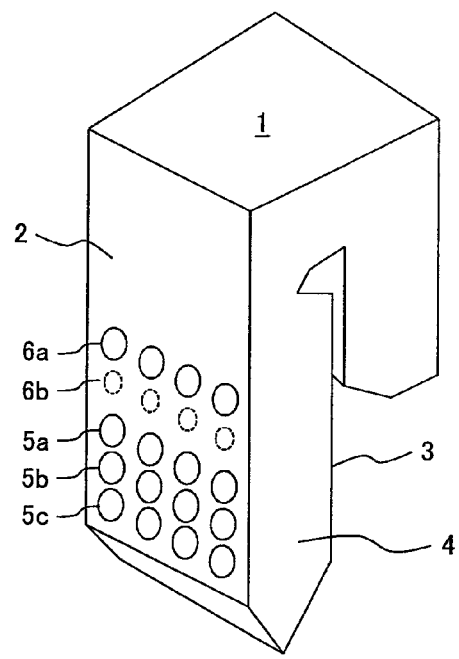
FIG. 1 is a structural view showing a furnace of a pulverized coal boiler for the present invention and the location of burners and openings for installing after-air ports.

In the pulverized coal boiler shown in FIG. 1, furnace walls making up a furnace 1 include a furnace front wall 2, a furnace back wall 3 opposing the furnace front wall 2, and furnace side walls 4 which are the both side walls between the furnace front wall 2 and the furnace back wall 3; and these furnace walls surround the furnace 1 to form a furnace combustion space for burning pulverized coal fuel in the furnace 1.

Three stages of openings (upper stage openings 5a, middle stage openings 5b, and lower stage openings 5c) for installing burners are provided in the lower portions of the furnace front wall 2 and the furnace back wall 3. Four openings 5a, 5b, and 5c are provided per stage, and a burner is installed to each opening.

On the furnace wall in the upper stage further above the location of the upper stage openings 5a for installing upper burners 7c, four openings 6a for installing after-air ports, which supply after-air into the furnace, are provided per stage, and the after-air port is set up in each opening 6a.

When the furnace is a two-stage after-air port type furnace, openings 6b for setting up sub-after-air ports are provided below the openings 6a for setting up the main after-air ports.

Although the present embodiment shows the four openings 5a, 5b, and 5c for installing burners and the four openings 6a for setting up after-air ports, the present invention has no limit to the number of openings on the pulverized coal boiler for retrofit.

In addition, the present invention is not limited to the pulverized coal boiler for retrofitting to a two-stage after-air style boiler having a main after-air port and a sub-after-air port.

Next, using FIG. 2, an overall structure of the air combustion boiler system for the present invention including, as a component, the above-described furnace of the pulverized coal boiler before retrofit will be described.

Figure 2:
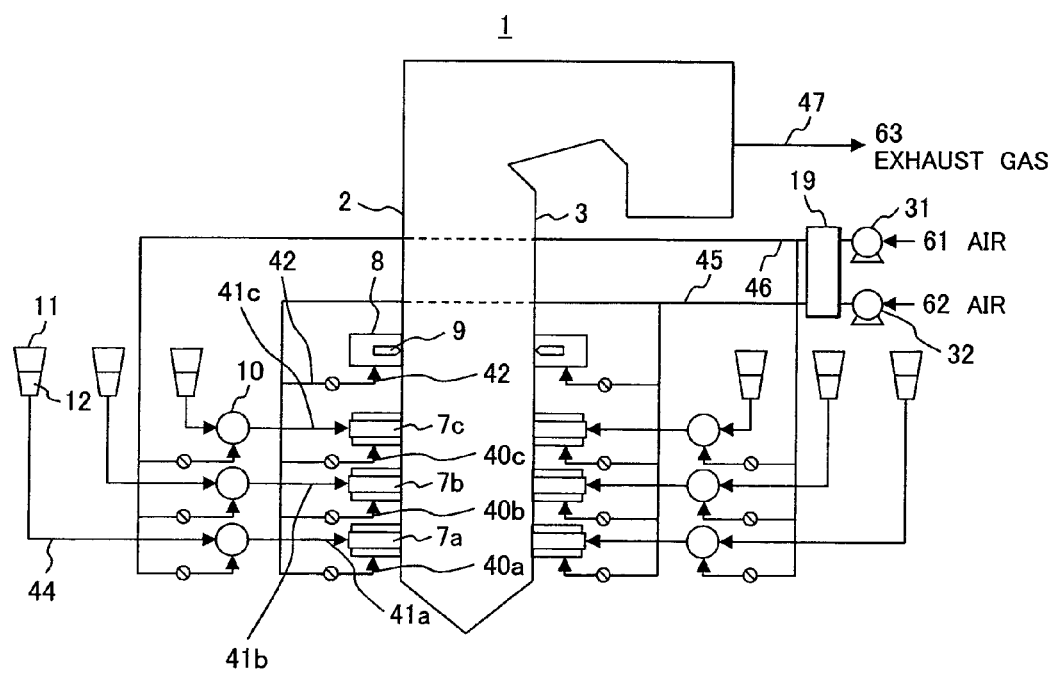
FIG. 2 is an overall structural view showing an air combustion boiler system including the pulverized coal boiler for the present invention before retrofit.

In FIG. 2, the air combustion boiler system having the pulverized coal boiler before retrofit includes the furnace 1, and in the lower portions of the furnace front wall 2 of the furnace 1 and the furnace back wall 3 opposing the furnace front wall 2, a plurality of stages of burners are provided facing each other along the vertical direction over three stages of lower stage burners 7a, middle stage burners 7b, and the upper stage burners 7c.

Two coal pulverizers 10 for pulverizing coal fuel into pulverized coal are each provided to the burner stages separately set up as the upper, middle, and lower stages on the furnace front wall 2 and the furnace back wall 3 of the furnace 1 (a total of six coal pulverizers in the upper, middle, and lower stages).

Coal 12 is a fuel stored in a hopper 11, and after being pulverized in the coal pulverizer 10, the pulverized coal is transported by air 61 supplied from a blower 31 to the coal pulverizer 10 through a pulverized coal transporting air supply line 46.

The pulverized coal is then supplied with the air 61 to each of the lower stage burners 7a, the middle stage burners 7b, and the upper stage burners 7c through coal supply pipes 41a, 41b, and 41c respectively, and ejected into the furnace 1 for burning. At the same time, air 62 supplied from a blower 32 as secondary and tertiary air for burners is supplied from a secondary and tertiary air supply line 45 for burners to the lower stage burners 7a, the middle stage burners 7b, and the upper stage burners 7c through secondary and tertiary air supply lines 40a, 40b, and 40c for burners respectively.

In the downstream side of the furnace walls on which the lower stage burners 7a, the middle stage burners 7b, and the upper stage burners 7c are installed, and in the upper stages further above the installation of the upper stage burners 7c on the furnace front wall 2 and the furnace back wall 3, a plurality of after-air ports 9a are set up facing each other. These after-air ports 9a supply additional air for two-stage combustion into the furnace 1.

The air 62 supplied from the blower 32 is supplied to each burner 7, as well as to each after-air port 9a through a windbox 8, after being preheated by an air preheater 19 which exchanges heat with exhaust gas 63 exhausted from the furnace 1 through an exhaust gas line 47.

Additionally, with regard to the furnace 1 of the pulverized coal boiler in the embodiment of the present invention, a partial structure of the furnace front wall of the pulverized coal boiler in the air combustion boiler system before retrofit, viewed from the furnace front wall, will be explained using FIG. 3.

Figure 3:
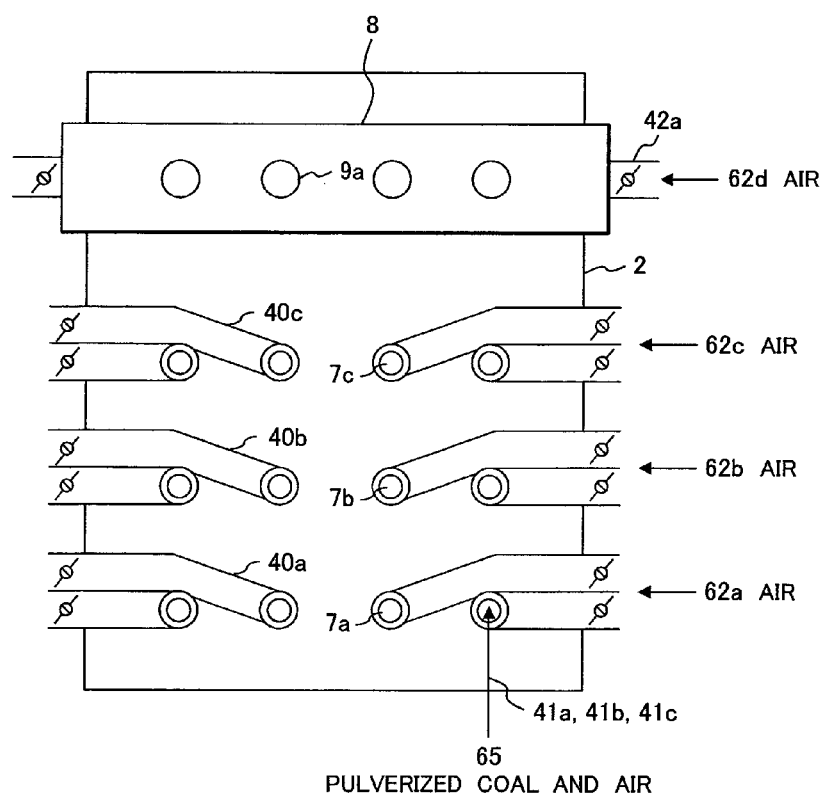
FIG. 3 is a partial structural view of the pulverized coal boiler in the air combustion boiler system before retrofit, viewed from the furnace front wall.

FIG. 3 is a partial structural view of the pulverized coal boiler in the air combustion boiler system before retrofit, viewed from the furnace front wall 2. Four burners are installed for each stage of the upper stage burners 7c, the middle stage burners 7b, and the lower stage burners 7a in the lower portion of the furnace front wall 2.

Pulverized coal fuel-and-air 65 is supplied through the coal supply pipes 41a, 41b, and 41c from the direction orthogonal to the furnace front wall 2, and air 62a, 62b, and 62c are each supplied as secondary and tertiary air for burners to the burners 7 through the secondary and tertiary air introducing lines 40a, 40b, and 40c.

The windbox 8 is installed on the furnace wall in the upper stage further above the installation of the upper stage burners 7c, and air 62d is supplied from the secondary and tertiary air supply line 45 for burners through an air line 42a for a windbox. The air 62d introduced into the windbox 8 is supplied into the furnace 1 through the after-air ports 9a.

Next, a method for retrofitting the above-mentioned air combustion boiler system into an oxyfuel combustion boiler system will be explained below.

Figure 4:
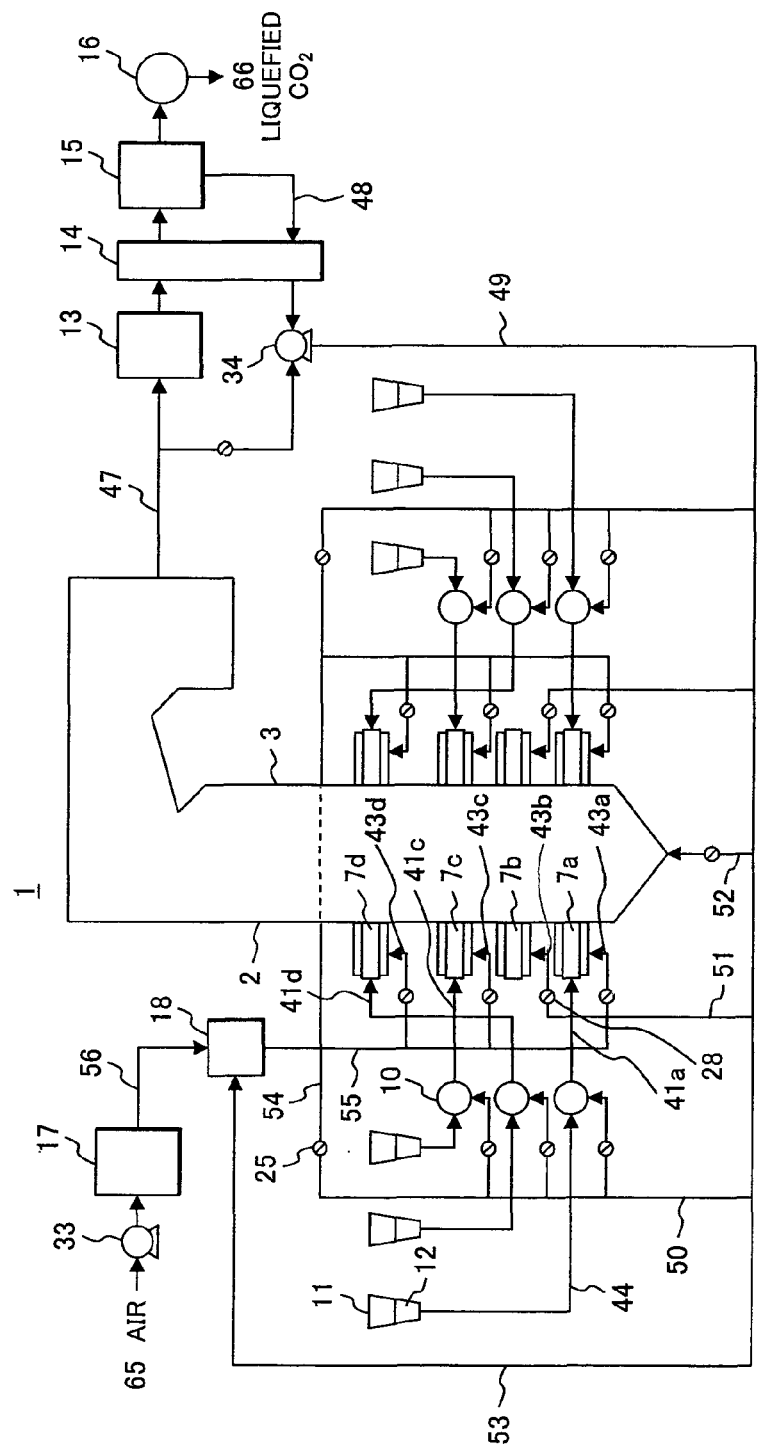
FIG. 4 is a structural view showing an oxyfuel combustion boiler system after retrofit of the pulverized coal boiler to have been retrofitted into a pulverized coal boiler in an oxyfuel combustion boiler system according to an embodiment of the present invention.

FIG. 4 is an overall structural view in which the pulverized coal boiler in the air combustion boiler system is retrofitted into a pulverized coal boiler in the oxyfuel combustion boiler system according to the embodiment of the present invention.

In the pulverized coal boiler retrofitted into the oxyfuel combustion boiler system according to the present embodiment, shown in FIG. 4, the middle stage burners 7b are stopped from supplying fuel into the furnace, in which case middle stage burners 7b are burners located in the middle stage among the upper stage burners 7c, the middle stage burners 7b, and the lower stage burners 7a disposed on the furnace front wall 2 and the furnace back wall 3 before retrofit.

Since the pulverized coal boiler in the present embodiment is provided with three-stage burners having the upper stage burners 7c, the middle stage burners 7b, and the lower stage burners 7a disposed on the furnace front wall 2 and the furnace back wall 3 of the furnace 1, the burners located in the middle stage will be the middle stage burners 7b; however, when, for example, four stages of burners are disposed on the furnace front wall 2 and the furnace back wall 3, the burners located in the middle stage will be either the burners in the second stage from the bottom or those in the second stage from the top.

New burners 7d are, then, installed to the openings 6a for installing after-air ports without creating a new opening on a wall surface of the furnace 1, extending each burner distance between the plurality of burners disposed along the vertical direction.

In the oxyfuel combustion boiler system retrofitted into in the present embodiment, an oxygen separator 17 and a gas mixer 18 are installed. Pure oxygen is made by the oxygen separator 17 having a cryogenic separation device and the like, which separates oxygen from air 65 supplied by a blower 33.

In the oxyfuel combustion boiler system, the exhaust gas line 47 for passing down exhaust gas, which is mainly $CO_2$, exhausted from the furnace 1 after pulverized coal has been burnt in the furnace 1 of the pulverized coal boiler is provided with a gas refiner 13 for refining the exhaust gas; a gas preheater 14 for exchanging heat using, as a heat source, the exhaust gas which has passed through the gas refiner 13; a cryogenic dehumidifier 15 for dehumidifying the exhaust gas which has passed through the gas preheater 14; and a $CO_2$ recovery device 16 for recovering $CO_2$ from the exhaust gas which has passed through the cryogenic dehumidifier 15 by cooling the gas. $CO_2$ in the exhaust gas is recovered as liquefied $CO_2$ (66) by the $CO_2$ recovery device 16.

In addition, part of the exhaust gas which has passed through the cryogenic dehumidifier 15 flows through a line 48 to the gas preheater 14, and after being preheated by the gas preheater 14, it is supplied as recirculation gas to the gas mixer 18 through recirculation lines 49 and 53 by a blower 34.

The oxygen made by the oxygen separator 17, supplied through an oxygen supply line 56 into the gas mixer 18, is mixed with the recirculation gas supplied through the recirculation line 53, and the mixed gas (the oxygen and the recirculation gas) is supplied through a supply line 55 for the mixed gas of oxygen and recirculation gas and through secondary and tertiary air introduction lines 43, which are supply lines for the oxygen and recirculation gas, to each of the lower stage burners 7a, the upper stage burners 7c, and the burners 7d installed to the openings 6 for installing after-air ports.

Each burner stage of the upper stage burners 7c, the lower stage burners 7a, and the burners 7d separately installed to the openings 6 for installing after-air ports on the furnace front wall 2 and the furnace back wall 3 of the furnace 1 is provided with two coal pulverizers 10 for supplying a pulverized coal fuel.

As a fuel, the coal 12 is pulverized in the coal pulverizer 10, and after turning into pulverized coal, it is transported by the recirculation gas flowing through a recirculation gas line 50. Then, the pulverized coal transported by the recirculation gas is supplied along with the recirculation gas to each of the lower stage burners 7a, the upper stage burners 7c, and the burners 7d through the coal supply pipes 41a, 41c, and 41d respectively to be ejected from each burner into the furnace 1 for burning.

The pulverized coal ejected into the furnace 1 from each burner may be difficult to ignite due to low oxygen concentration in the recirculation gas; however, the amount of oxygen supplied to the coal pulverizer 10 can be adjusted by operating a flow rate adjuster 25 for adding oxygen to the recirculation gas, provided to an oxygen supply line 54 for supplying oxygen to the recirculation gas for transporting pulverized coal, to improve ignition performance of the pulverized coal by increasing the oxygen concentration as necessary.

The stopped middle stage burners 7b are used as inlets for recirculation gas 69. The recirculation gas passed through a supply line 51 for supplying the recirculation gas to the stopped burner is supplied from the burners 7b into the furnace 1, and the supply amount of the recirculation gas 69 is adjusted by a flow rate adjuster 28 installed to the recirculation gas supply line 51 to adjust the heat load in the furnace.

The exhaust gas, which is mainly $CO_2$, exhausted from the furnace 1 after burning the pulverized coal through the exhaust gas line 47 is refined in the gas refiner 13 installed to the exhaust gas line 47, then in sequence, goes through heat exchange in the gas preheater 14 downstream, and after being dehumidified in the cryogenic dehumidifier 15 further downstream, it is cooled in the $CO_2$ recovery device to be recovered as the liquefied $CO_2$ (66).

On the other hand, part of the exhaust gas exhausted from the furnace 1 through the exhaust gas line 47 passes through the recirculation line 48 for refined exhaust gas, and after being preheated by the gas preheater 14, it is supplied by the blower 34 to the recirculation gas line 49 as the recirculation gas 69.

This recirculation gas 69 supplied to the recirculation gas line 49 flows down separately into each of the three lines of the recirculation gas supply line 51 to the stopped burners, the circulation gas supply line 52 from a hopper, and the recirculation line 53, from the recirculation gas line 49.

The recirculation gas 69 that separately flows down to the recirculation gas supply line 51 is sent to the stopped burners 7b to adjust the heat load in the furnace 1, and the recirculation gas 69 that separately flows down to the recirculation gas supply line 52 is recirculated from the lower portion of the furnace 1.

The recirculation gas that separately flows down to the recirculation line 53 is supplied to the gas mixer 18, mixed in the gas mixer 18 with oxygen made in the air separation unit 17, and supplied as combustion-enhancing gas for burning pulverized coal from each of secondary and tertiary air introducing lines 43a, 43c, and 43d, which are supply lines for supplying the oxygen and recirculation gas to each burner of the lower stage burners 7a, the upper stage burners 7c, and the burners 7d, for recirculation.

Figure 5:
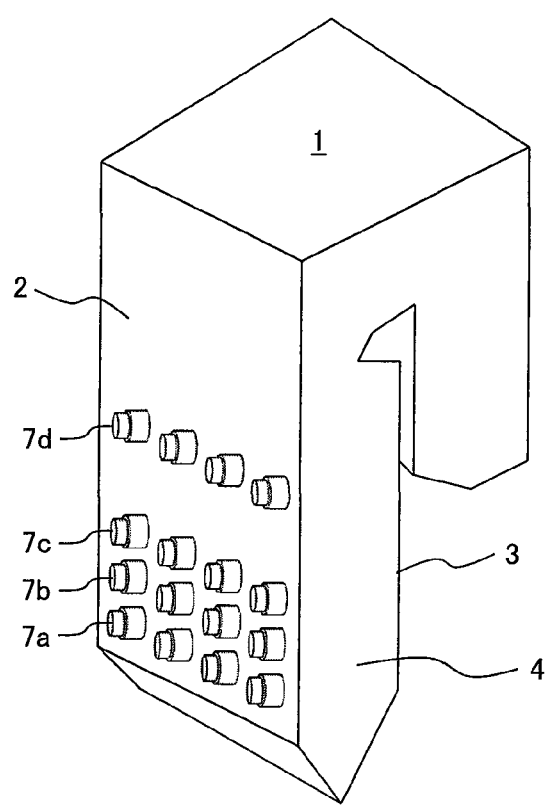
FIG. 5 is a schematic structural view showing a furnace of the pulverized coal boiler and burners installed to the furnace after retrofit in the embodiment of the present invention shown in FIG. 4.

FIG. 5 is a schematic diagram showing the furnace of the pulverized coal boiler and the burners installed to the furnace after the pulverized coal boiler in the air combustion boiler system is retrofitted into the oxyfuel combustion boiler system according to the present embodiment. In the furnace 1, as shown in FIG. 5, the burners 7d are installed to the openings 6a for installing after-air ports. In the figure, the coal supply pipes 41 and the secondary and tertiary gas supply lines 43 for burners are not shown.

Figure 6:
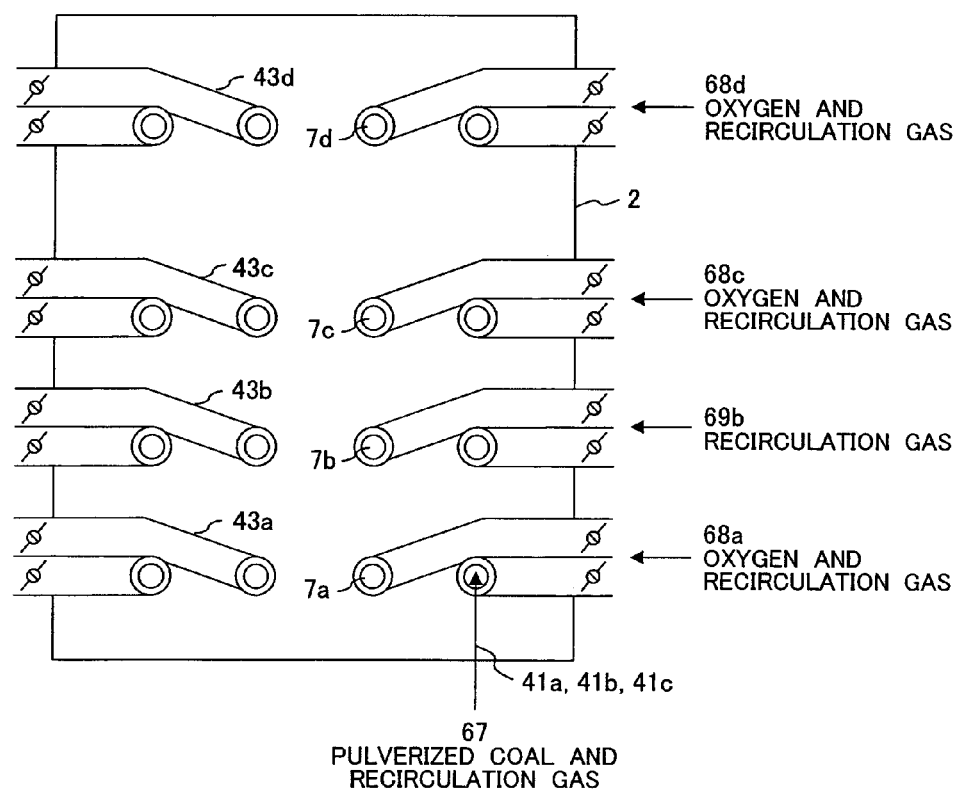
FIG. 6 is a partial structural view of the pulverized coal boiler after retrofit to have been retrofitted into the pulverized coal boiler in the oxyfuel combustion boiler system according to an embodiment of the present invention, viewed from the furnace front wall.

FIG. 6 is a partial structural view of the pulverized coal boiler after the pulverized coal boiler in the air combustion boiler system is retrofitted into the oxyfuel combustion boiler system according to the present embodiment, viewed from the furnace front wall 2. Four burners are installed per each burner installation stage of the lower stage burners 7a, the upper stage burner 7c, and the stopped middle stage burners 7b installed in the lower portion of the furnace front wall 2, as well as the burners 7d installed to the openings 6 for installing after-air ports on the furnace front wall 2.

Then, the lower stage burners 7a, the upper stage burners 7c, and the burners 7d installed to the openings 6 for installing after-air ports are supplied with pulverized coal-and-recirculation gas 67 through the coal supply pipes 41a, 41c, and 41d from the orthogonal direction to the furnace front wall 2, and with oxygen-and-recirculation gases 68a, 68c, and 68d through the secondary and tertiary air introducing lines 43a, 43c, and 43d.

In addition, recirculation gas 69b supplied to the stopped middle stage burners 7b through secondary and tertiary air introducing line 43b is supplied from the middle stage burners 7b into the furnace 1 to adjust the heat load in the furnace 1.

An example of the embodiment of the present invention in which a pulverized coal boiler in the air combustion boiler system is retrofitted into a pulverized coal boiler in the oxyfuel combustion boiler system has been explained above. Next, with regard to a change in the composition of combustion-enhancing gas supplied to the pulverized coal boiler as a combustion-enhancing gas mixed from oxygen and recirculation gas, a problem arising from it and a solution to the problem will be discussed.

When a pulverized coal boiler in the air combustion boiler system is retrofitted into a pulverized coal boiler in the oxyfuel combustion boiler system, it is preferable from the standpoint of retrofit cost that the balance of the heat absorption amount of each heat exchanger in the air combustion also be kept in the oxyfuel combustion.

This is because, in the design stage of the boiler, material for the heat exchangers is selected based on the balance of the heat absorption amount (steam temperature and pressure in a water tube and gas temperature outside the water tube) of each heat exchanger installed to the furnace 1. In the heat exchanger, a high price material with superior heat resistance is used in a high temperature region, and a low price material with lesser heat resistance is used in a relatively low temperature region.

When the boiler system is changed from air combustion to oxyfuel combustion, greatly changing the balance of the heat absorption in the oxyfuel combustion from the balance of the heat absorption in the air combustion, the conditions such as temperature based on which material was selected in the design stage will be changed. This brings anticipation that if the system is left as-is, its operation may not be continued due to the heat resistance of the material.

In such case, retrofit becomes necessary to change the heat transmission area in each heat exchanger so that temperatures do not exceed the service temperature limit of the material (addition or deletion of a water tube). From the above requirement, if the balance of the heat absorption amount in the air combustion can be re-created in the oxyfuel combustion, then the retrofit for changing the heat transmission areas will be unnecessary, thus reducing the retrofit cost.

In order to achieve the same heat absorption condition as the air combustion by using the existing group of heat exchangers, the oxygen concentration of combustion-enhancing gas is required to be increased to at least the oxygen concentration in air (21%) or more. When the oxygen concentration is increased to 21% or more, however, the burning temperature of pulverized coal will go up, causing the heat load in the furnace to increase. This is a problem.

Figure 7:
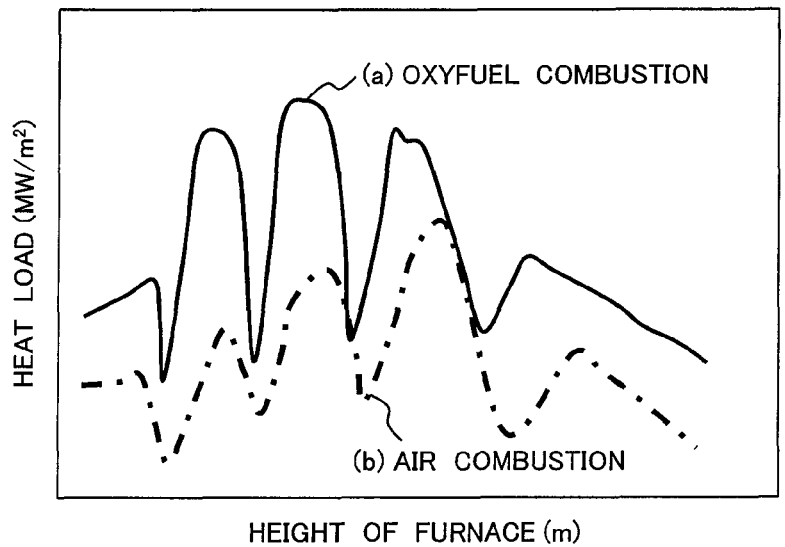
FIG. 7 is a pattern diagram showing the heat load distribution in the furnaces in air combustion and in oxyfuel combustion having an oxygen concentration that makes the heat absorbing condition of the oxyfuel combustion the same as that of the air combustion.

FIG. 7 is a pattern diagram showing the effect of oxyfuel combustion on the heat load distribution in the furnace. In FIG. 7, an alternate long and short dash line (b) shows the heat load distribution in the furnace in the air combustion, and a solid line (a) shows the head load distribution in the furnace 1 when the oxygen concentration is increased to match the heat absorption condition in the air combustion. As shown by the solid line (a) in FIG. 7, when the oxygen concentration is increased in the oxyfuel combustion, the heat load in the furnace is increased.

In the oxyfuel combustion boiler system, the oxygen concentration in combustion-enhancing gas can be varied by adjusting the amount of recirculation gas. In order to reduce the heat load in the furnace 1, the amount of recirculation gas can be increased to reduce the oxygen concentration. When the amount of recirculation gas is increased, however, the blower power for blowing the recirculation gas will be increased. This is disadvantageous in the view of net thermal efficiency.

Thus, in the method for retrofitting into the pulverized coal boiler in the oxyfuel combustion boiler system according to the present embodiment, the middle stage burners 7b are stopped from being used and at the same time, the new burners 7d are installed to retrofit to the openings for installing after-air ports, to extend the burner distance along the vertical direction between each burner of the lower stage burners 7a, the upper stage burners 7c, and the new burners 7d installed on the furnace walls, thereby reducing the heat load in the furnace.

Figure 8:
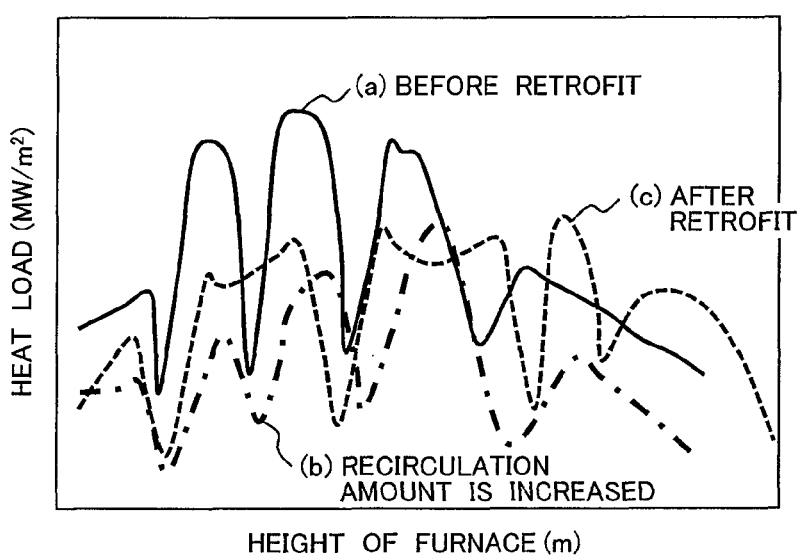
FIG. 8 is a pattern diagram showing the heat load distribution in the furnace of the pulverized coal boilers before retrofit and after retrofit to have been retrofitted into the oxyfuel combustion boiler system according to an embodiment of the present invention.

FIG. 8 is a pattern diagram showing a reduction in heat load when the pulverized coal boiler in the air combustion system is retrofitted into the pulverized coal boiler in the oxyfuel combustion boiler system according to the embodiment of the present invention.

In FIG. 8, a solid line (a) shows the heat load distribution in the furnace 1 when the oxygen concentration is increased to match the heat absorption condition of the air combustion, and an alternate long and short dash line (b) shows the heat load distribution in the furnace 1 when the oxygen concentration is increased by increasing the amount of recirculation gas.

A broken line (c) in FIG. 8 shows the heat load distribution in the furnace 1, which is reduced by retrofit into the pulverized coal boiler in the oxyfuel combustion boiler system according to the present embodiment.

As can be understood by comparing each heat load distribution in the furnace 1 shown in FIG. 8, the retrofit into the pulverized coal boiler in the oxyfuel combustion boiler system according to the present embodiment can reduce the heat load in the furnace 1 without increasing house power.

In addition to the method for retrofitting into the pulverized coal boiler in the oxyfuel combustion boiler system according to the present embodiment, the supply amount of recirculation gas by the blower 34 for supplying the recirculation gas to the pulverized coal boiler can be reduced to increase the oxygen concentration in combustion-enhancing gas, which is mixed from oxygen and recirculation gas to be supplied to the pulverized coal boiler. This not only reduces the heat load in the furnace 1 to a desired state, but also reduces the heat recovery loss and the blower power for blowing the recirculation gas, thereby improving the net thermal efficiency of the oxyfuel combustion boiler system.

Furthermore, in the method for retrofitting into the pulverized coal boiler in the oxyfuel combustion boiler system according to the present embodiment, the burners can be installed without making a new opening in the wall surface of the furnace 1 so that a pulverized coal boiler which maintains its structural reliability can be achieved at low cost in a short period of time.

According to the present embodiment, when a pulverized coal boiler in the air combustion boiler system is retrofitted into a two-stage combustion pulverized coal boiler having a burner and an after-air port in the oxyfuel combustion boiler system, the heat load on a furnace wall of the pulverized coal boiler can be reduced so that retrofit into the pulverized coal boiler in the oxyfuel combustion boiler system which can maintain structural reliability can be achieved at low cost in a short period of time.

(Embodiment 2)

Next, a method for retrofitting a pulverized coal boiler in the air combustion boiler system into a pulverized coal boiler in the oxyfuel combustion boiler system according to another embodiment of the present invention will be described using FIGS. 9 and 10.

Figure 9:
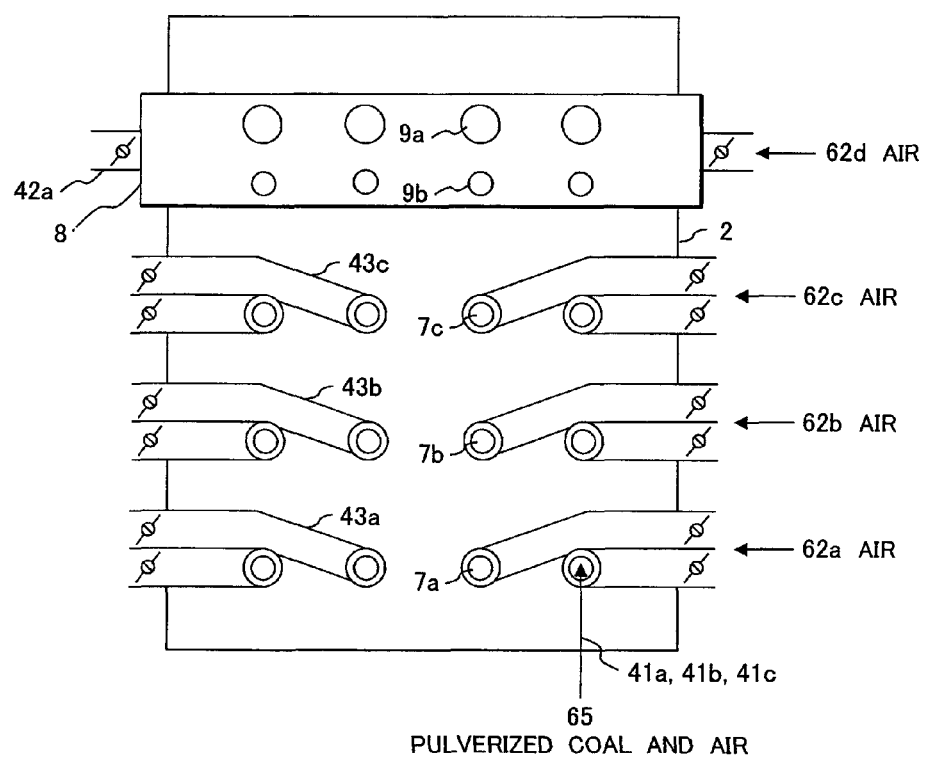
FIG. 9 is a partial structural view showing a furnace having two-stage after-air ports of a pulverized coal boiler in an air combustion boiler system before retrofit.
Figure 10:
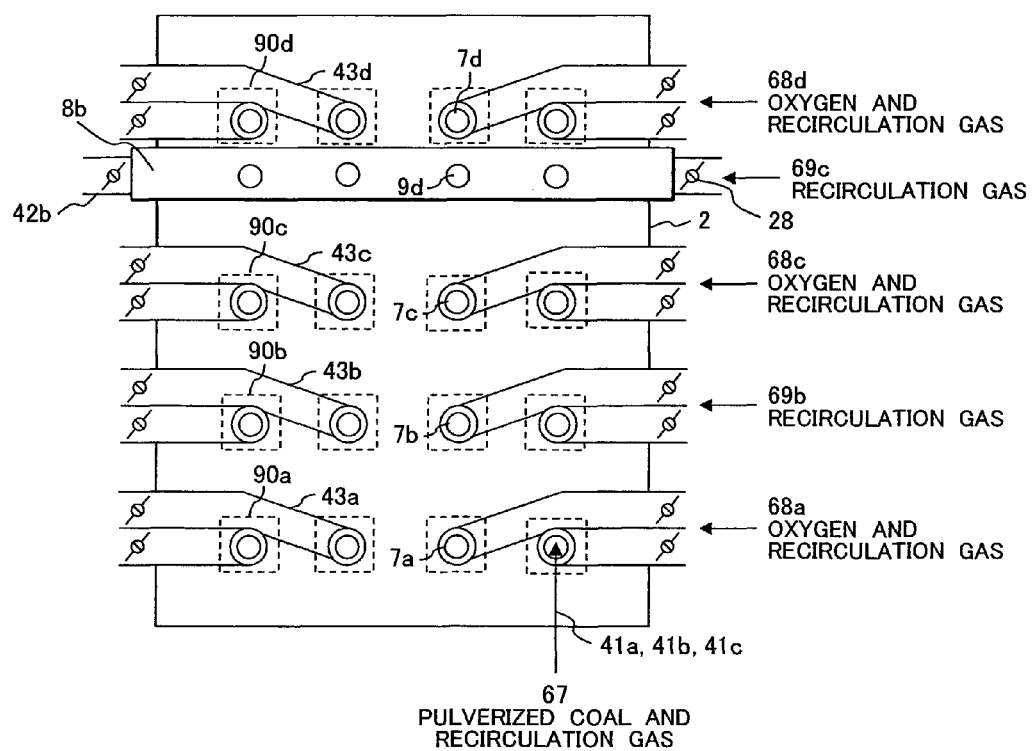
FIG. 10 is a partial structural view showing the furnace having two-stage after-air ports of the pulverized coal boiler after retrofit to have been retrofitted into a pulverized coal boiler in an oxyfuel combustion boiler system according to another embodiment of the present invention.

For the method for retrofitting a pulverized coal boiler in the air combustion boiler system before retrofit shown in FIG. 9 is retrofitted into the pulverized coal boiler in the oxyfuel combustion boiler system shown in FIG. 10 according to the present embodiment, since the overall structure of the pulverized coal boiler according to the present embodiment shown in FIG. 10 has some common components with the method for retrofitting the pulverized coal boiler into the oxyfuel combustion boiler system in the previous embodiment shown in FIG. 4, the common components between them are not described and only different components in the present embodiment are explained below.

A method for retrofitting a pulverized coal boiler having two-stage after-air ports in a furnace will be described as the method for retrofitting the pulverized coal boiler in the air combustion boiler system shown in FIG. 9 into the pulverized coal boiler in the oxyfuel combustion boiler system according to the present embodiment.

Two-stage after-air ports installed on a furnace wall of the pulverized coal boiler in the air combustion boiler system before retrofit shown in FIG. 9 include main after-air ports 9a and sub-after-air ports 9b in the lower stage of the main after-air ports 9a.

FIG. 9 is a partial structural view of the pulverized coal boiler having two-stage after-air ports in the air combustion boiler system before retrofit, viewed from the furnace front wall 2 of the furnace 1. Four burners 7a, 7b, and 7c are installed per each burner stage of the upper stage burners 7c, the middle stage burners 7b, and the lower stage burners 7a in the lower portion of the furnace front wall 2.

The pulverized coal fuel-and-air 65 is supplied through each of the coal supply pipes 41a, 41b, and 41c from the orthogonal direction to the furnace front wall 2, and the air 62a, 62b, and 62c is supplied as secondary and tertiary air for burners to the burners 7a, 7b, and 7c through the secondary and tertiary air introducing lines 40a, 40b, and 40c respectively.

In the upper stage on the furnace wall further above the installation of the upper stage burners 7c, the windbox 8 is installed, and the air 62d is supplied to the windbox 8 from the secondary and tertiary air supply line 45 for burners through the air line 42a for a windbox.

The air 62d introduced into the windbox 8 is supplied into the furnace 1 through the main after-air ports 9a and the sub-after-air ports 9b, which are openings formed on the furnace wall. The windbox 8 for two-stage after-air ports can supply air to both the main after-air ports 9a and the sub-after-air ports 9b.

FIG. 10 is a partial structural view of a pulverized coal boiler, viewed from the furnace front wall 2, after the pulverized coal boiler having two-stage after-air ports in the air combustion boiler system before retrofit shown in FIG. 9 has been retrofitted into a pulverized coal boiler having two-stage after-air ports in the oxyfuel combustion boiler system according to the present embodiment.

In the pulverized coal boiler after retrofitted into the oxyfuel combustion boiler system according to the present embodiment shown in FIG. 10, the middle burners 7b are stopped from being used among the upper stage burners 7c, the middle stage burners 7b, and the lower stage burners 7a disposed on the furnace front wall 2 and the furnace back wall 3 before retrofit.

Furthermore, the new burners 7d are installed to retrofit to the openings formed for installing main after-air ports 9a, without creating a new opening on the furnace wall downstream of the upper burners 7c, to extend the burner distance along the vertical direction between each burner of the lower stage burners 7a, the upper stage burners 7c, and the new burners 7d installed along the vertical direction on the furnace wall, thereby reducing the heat load in the furnace.

In addition, the windbox 8 is removed to install a windbox 8b, which is for supplying gas to the sub-after-air ports 9d, to the openings for installing sub-after-air ports 9d, and recirculation gas 69c is supplied to the windbox 8b through an air line 42b for a windbox.

The recirculation gas 69c introduced to the windbox 8b through the air line 42b for a windbox, then, is supplied from the sub-after-air ports 9d into the furnace 1 to adjust the heat load in the furnace 1.

Four burners 7 are installed per each burner stage of the lower stage burners 7a, the middle stage burners 7b, and the upper stage burners 7c installed in the lower portion of the furnace front wall 2, as well as the burners 7d installed to the openings for installing after-air ports on the furnace front wall 2.

Windboxes 90a, 90c, and 90d are retrofitted to install separately to the lower stage burners 7a, the upper stage burners 7c, and the burners 7d for installing to the openings of the after-air ports 9a respectively, and in the same manner as the previous embodiment shown in FIG. 4, the pulverized coal fuel-and-recirculation gas 67 is supplied to the windboxes 90a, 90c, and 90d through the coal supply pipes 41a, 41c, and 41d from the orthogonal direction to the furnace front wall 2, and oxygen-and-recirculation gases 68a, 68c, and 68d are supplied to the windboxes 90a, 90c, and 90d through the secondary and tertiary air introducing lines 43a, 43c, and 43d, and supplied into the furnace from the lower stage burners 7a, the upper stage burners 7c, and the burners 7d to adjust the heat load in the furnace.

The pulverized coal fuel-and-recirculation gas 67 is supplied to the furnace through the burners 7d installed to the openings for installing after-air ports 9a, thereby allowing the heat load in the lateral direction in the furnace downstream of the windbox 8b to be adjusted.

In addition, windboxes 90b are separately installed to the stopped middle stage burners 7b to supply the recirculation gas 69b to the windboxes 90b, using them as inlets for the recirculation gas 69b supplied from the middle stage burners 7b to the furnace 1.

As shown in the above description, according to the present embodiment, when the pulverized coal boiler in the air combustion boiler system is retrofitted into the two-stage combustion pulverized coal boiler having burners and after-air ports in the oxyfuel combustion boiler system, not only the heat load on a furnace wall of the pulverized coal boiler can be reduced and retrofit into the pulverized coal boiler in the oxyfuel combustion boiler system which maintains structural reliability can be achieved at low cost in a short period of time, but also the heat load in the lateral direction in the furnace downstream of the windbox 8b can be adjusted.

(Embodiment 3)

Next, a method for retrofitting a pulverized coal boiler in which a pulverized coal boiler in the air combustion boiler system is retrofitted into a pulverized coal boiler in the oxyfuel combustion boiler system according to yet another embodiment of the present invention will be described using FIGS. 11 and 12.

Figure 11:
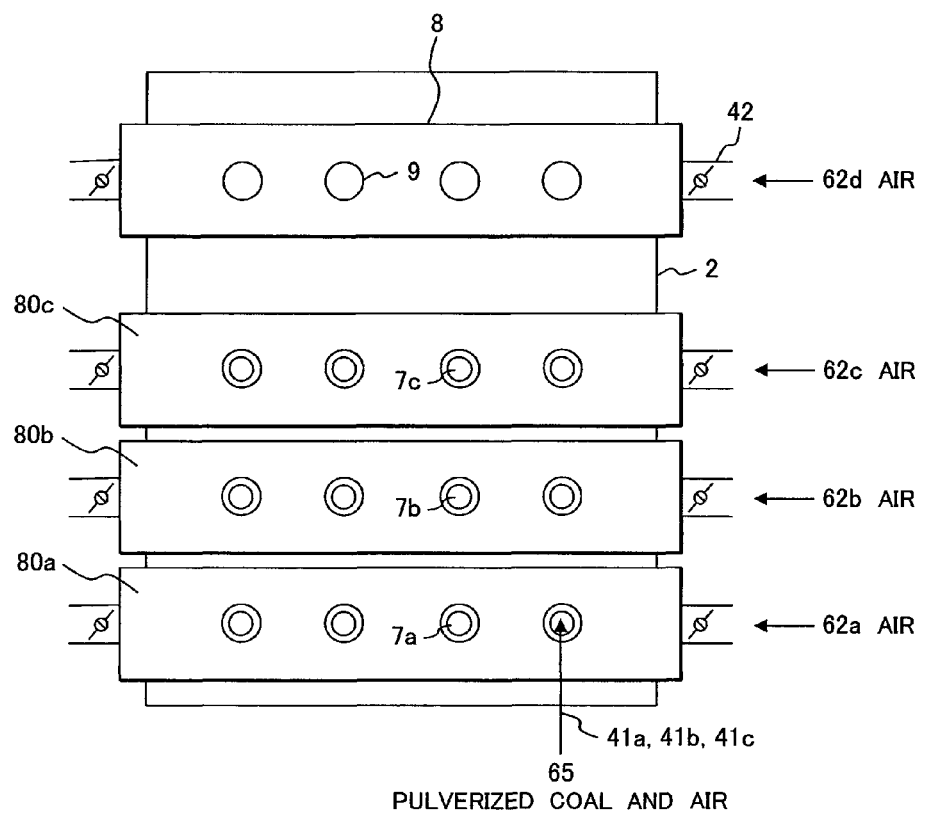
FIG. 11 is a partial structural view showing a furnace having a common-style windbox for a burner of a pulverized coal boiler in an air combustion boiler system before retrofit.
Figure 12:
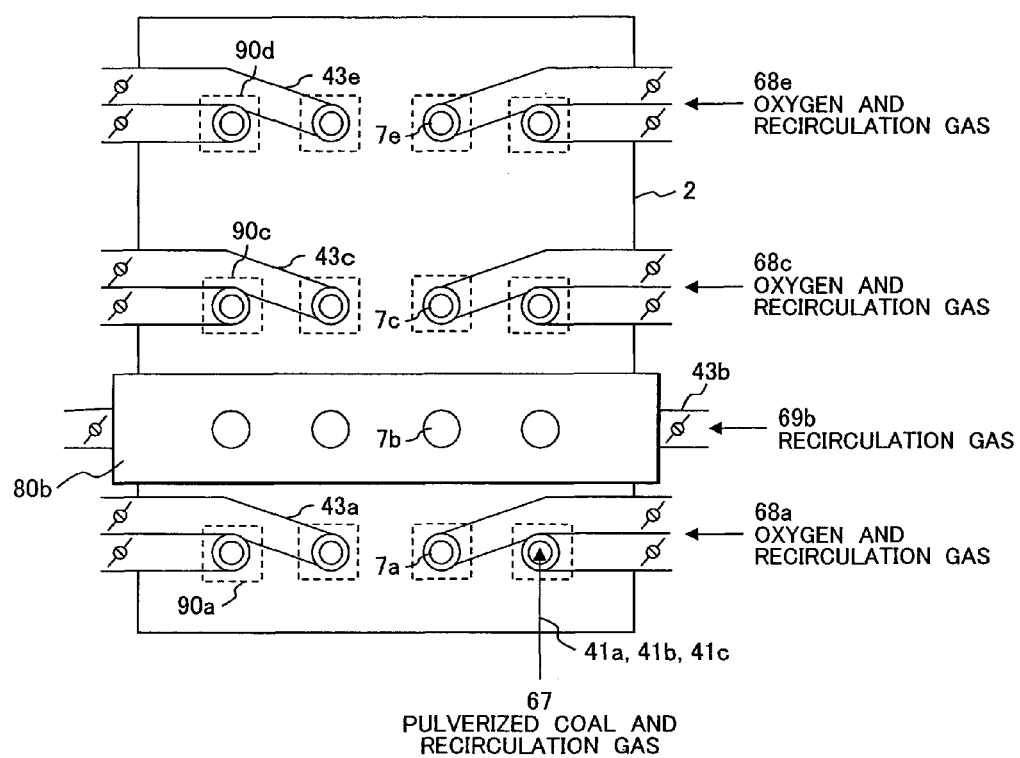
FIG. 12 is a partial structural view showing the furnace having a common-style windbox for a burner of the pulverized coal boiler after retrofit to have been retrofitted into a pulverized coal boiler in an oxyfuel combustion boiler system according to yet another embodiment of the present invention.

For the method for retrofitting a pulverized coal boiler in which the pulverized coal boiler in the air combustion boiler system before retrofit shown in FIG. 11 is retrofitted into the pulverized coal boiler in the oxyfuel combustion boiler system shown in FIG. 12 according to the present embodiment, since the overall structure of the pulverized coal boiler shown in FIG. 12 has some common components with the method for retrofitting pulverized coal boiler in the previous embodiment shown in FIG. 4, the common components between them are not described and only different components in the present embodiment are explained below.

FIG. 11 is a partial structural view of a pulverized coal boiler before retrofit, viewed from the furnace front wall 2, in which pulverized coal boiler in the air combustion boiler system has common-structure windboxes for burners.

In the pulverized coal boiler in the air combustion boiler system before retrofit shown in FIG. 11, four burners 7a, 7b, and 7c are installed per each burner stage of the upper stage burners 7c, the middle stage burners 7b, and the lower stage burners 7a in the lower portion of the furnace front wall 2.

The pulverized coal fuel-and-air 65 is supplied through the coal supply pipes 41a, 41b, and 41c from the orthogonal direction to the furnace front wall 2, and the air 62a, 62b, and 62c is supplied as secondary and tertiary air for burners to the burners 7a, 7b, and 7c through the secondary and tertiary air introducing lines 40a, 40b, and 40c and through common windboxes 80a, 80b, and 80c for burners.

The windbox 8 for after-air ports is installed to the upper stage further above the upper stage burners 7c on the furnace wall and the air 62d is supplied from the secondary and tertiary air supply line 45 for burners through the air line 42 for a windbox.

The air 62d introduced into the windbox 8 is supplied into the furnace 1 through the after-air ports 9.

FIG. 12 is a partial structural view of a pulverized coal boiler, viewed from the furnace front wall 2, after the pulverized coal boiler in the air combustion boiler system before retrofit shown in FIG. 11 has been retrofitted into a pulverized coal boiler in the oxyfuel combustion boiler system according to the present embodiment.

In the pulverized coal boiler after retrofit into the oxyfuel combustion boiler system according to the present embodiment shown in FIG. 12, the middle stage burners 7b are stopped from being used among the upper stage burners 7c, the middle stage burners 7b, and the lower stage burners 7a disposed on the furnace front wall 2 and the furnace back wall 3 before retrofit.

The windbox 80b for the middle stage burners 7b is left untouched, the recirculation gas 69b is introduced into the windbox 80b through secondary and tertiary air introducing line 43b, and the recirculation gas 69b is supplied into the furnace 1 from the middle stage burners 7b to adjust the heat load in the furnace.

In addition, the windbox 8 is removed and burners 7e are installed to retrofit to the openings for installing after-air ports 9, without creating a new opening, to extend the burner distance along the vertical direction between each burner of the lower stage burners 7a, the upper stage burners 7c, and the new burners 7e installed along the vertical direction on the furnace wall, thereby reducing the heat load in the furnace.

On the other hand, in order to allow slight adjustments of the heat load in the furnace, the lower stage burners 7a and the upper stage burners 7c installed to the lower portion of the furnace front wall 2 and the furnace back wall 3 are retrofitted into separate structures by connecting each burner in the lower stage burners 7a and the upper stage burners 7c to each of the secondary and tertiary gas lines 68a and 68c for burners respectively.

In the pulverized coal boiler shown in FIG. 12, four burners 7 are installed per each burner installation stage of the lower stage burners 7a and the upper stage burners 7c installed in the lower portion of the furnace front wall 2 and the furnace back wall 3 and the new burners 7e installed to the openings for installing after-air ports 9.

The windboxes 90a, 90c, and 90d are separately retrofitted to provide to the lower stage burners 7a, the upper stage burners 7c, and the burners 7e installed to the openings for installing after-air ports 9 respectively, and in the same manner as in the previous embodiment shown in FIG. 4, the pulverized coal fuel-and-recirculation gas 67 is supplied to the windboxes 90a, 90c, and 90d through the coal supply pipes 41a, 41c, and 41d from the orthogonal direction to the furnace front wall 2, the oxygen-and-recirculation gases 68a, 68c, and 68d are supplied to the windboxes 90a, 90c, and 90d through the secondary and tertiary air introducing lines 43a, 43c, and 43d, and supplied into the furnace from the lower stage burners 7a, the upper stage burners 7c and the burners 7e to adjust the heat load in the furnace.

To utilize the windbox 80b installed to the stopped burners 7b, the windbox 80b is retrofitted to be supplied with the recirculation gas 69b through the secondary and tertiary air introducing line 43b, and the recirculation gas 69b introduced through the secondary and tertiary air introducing line 43b is supplied from the middle stage burners 7b into the furnace 1 to adjust the heat load in the furnace.

As shown in the above description, according to the present embodiment, when the pulverized coal boiler in the air combustion boiler system is retrofitted into the two-stage combustion pulverized coal boiler having burners and after-air ports in the oxyfuel combustion boiler system, not only the heat load on a furnace wall of the pulverized coal boiler can be reduced and retrofit into the pulverized coal boiler in the oxyfuel combustion boiler system which maintains structural reliability can be achieved at low cost in a short period of time, but also the heat load in the lateral direction in the furnace can be adjusted over the entire region of the furnace where the burners are installed.

The present invention is applicable to a method for retrofitting a pulverized coal boiler in the air combustion boiler system into a pulverized coal boiler in the oxyfuel combustion boiler system.

What is claimed is:

1. A method for retrofitting a pulverized coal boiler in an air combustion boiler system having a plurality of burners over a plurality of stages along the vertical direction on a wall surface of a furnace of the pulverized coal boiler and an after-air port for introducing air for two-stage combustion located above the burners to retrofit into a two-stage combustion pulverized coal boiler in an oxyfuel combustion boiler system, wherein installing an air separation unit for separating oxygen from air and a $CO_2$ recovery device for absorbing and separating $CO_2$ gas from combustion exhaust gas generated in the boiler furnace, wherein the method for retrofitting the combustion pulverized coal boiler is comprising the steps of:

stopping to supply fuel into the furnace from a burner located in a middle stage among the plurality of stages of burners installed on the wall surface of the furnace of the pulverized coal boiler;

installing a new burner to an opening of the after-air port provided on the wall surface of the furnace of the pulverized coal boiler; and installing a supply line to introduce the oxygen manufactured by the air separation unit and part of the recirculation gas, which is part of the exhaust gas exhausted from the pulverized coal boiler, circulated into the pulverized coal boiler, to the plurality of stages of burners except for the stopped burner and to the new burner installed to the opening of the after-air port through the supply line, and supplying the oxygen and the recirculation gas from the plurality of stages of burners and the new burner into the furnace.

2. The method for retrofitting a pulverized coal boiler according to claim 1, wherein the method for retrofitting the combustion pulverized coal boiler is further comprising the steps of:

installing an another supply line to introduce part of the recirculation gas, which is part of the exhaust gas exhausted from the pulverized coal boiler, circulated into the pulverized coal boiler, to the stopped burner through the another supply line, and supplying the recirculation gas from the stopped burners into the furnace.

3. A method for retrofitting a pulverized coal boiler in an air combustion boiler system having a plurality of burners over a plurality of stages along the vertical direction on a wall surface of a furnace of the pulverized coal boiler, a main after-air port and a sub-after-air port located in the lower stage of the main after-air port for introducing air for two-stage combustion located above the burners to retrofit into a two-stage combustion pulverized coal boiler in an oxyfuel combustion boiler system, wherein installing an air separation unit for separating oxygen from air and a $CO_2$ recovery device for absorbing and separating $CO_2$ gas from combustion exhaust gas generated in the boiler furnace, wherein the method for retrofitting the combustion pulverized coal boiler is comprising the steps of:

stopping to supply fuel into the furnace from a burner located in a middle stage among the plurality of stages of burners installed on the wall surface of the furnace of the pulverized coal boiler;

installing another burner to an opening of the main after-air port provided on the wall surface of the furnace of the pulverized coal boiler; and installing a supply line to introduce the oxygen manufactured by the air separation unit and part of the recirculation gas, which is part of the exhaust gas exhausted from the pulverized coal boiler, circulated into the pulverized coal boiler, to the plurality of stages of burners except for the stopped burner and to the another burner installed to the opening of the main after-air port through the supply line, and supplying the oxygen and the recirculation gas from the plurality of stages of burners and the another burner into the furnace.

4. The method for retrofitting a pulverized coal boiler according to claim 3, wherein the method for retrofitting the combustion pulverized coal boiler is comprising the steps of:

installing an another supply line to introduce part of the recirculation gas, which is part of the exhaust gas exhausted from the pulverized coal boiler, circulated into the pulverized coal boiler, to the stopped burner through the another supply line, and supplying the recirculation gas from the stopped burners into the furnace; and installing a other supply line to introduce part of the recirculation gas to a new windbox installed to an opening of the sub after-air port provided on the wall surface of the furnace through the other supply line, and supplying the recirculation gas from the stopped burner and the opening of the sub after-air port into the furnace.

5. A method for retrofitting a pulverized coal boiler in an air combustion boiler system having a plurality of burners over a plurality of stages along the vertical direction on a wall surface of a furnace of the pulverized coal boiler and an after-air port for introducing air for two-stage combustion located above the burners to retrofit into a two-stage combustion pulverized coal boiler in an oxyfuel combustion boiler system, wherein installing an air separation unit for separating oxygen from air and a $CO_2$ recovery device for absorbing and separating $CO_2$ gas from combustion exhaust gas generated in the boiler furnace, wherein the method for retrofitting the combustion pulverized coal boiler is comprising the steps of:

stopping to supply fuel into the furnace from a burner located in a middle stage among the plurality of stages of burners installed on the wall surface of the furnace of the pulverized coal boiler;

installing a new burner to an opening of the after-air port provided on the wall surface of the furnace of the pulverized coal boiler;

installing a new windbox to the plurality of stages of burners except for the stopped burner and to the new burner installed to the opening of the after-air port; and installing a supply line to introduce the oxygen manufactured by the air separation unit and part of the recirculation gas, which is part of the exhaust gas exhausted from the pulverized coal boiler, circulated into the pulverized coal boiler, to the plurality of stages of burners except for the stopped burner and to the new windbox installed to the opening of the after-air port through the supply line, and supplying the oxygen and the recirculation gas from the plurality of stages of burners and the new burner into the furnace.

6. The method for retrofitting a pulverized coal boiler according to claim 5, wherein the method for retrofitting the combustion pulverized coal boiler is comprising the steps of:

installing an another supply line to introduce part of the recirculation gas, which is part of the exhaust gas exhausted from the pulverized coal boiler, circulated into the pulverized coal boiler, to the stopped burner through the another supply line, and supplying the recirculation gas from the stopped burners into the furnace.

* * * * *